United States Patent [19]

Rabussier et al.

[11] 3,876,762

[45] Apr. 8, 1975

[54] METHOD OF MANUFACTURE OF DEVICES FOR EMITTING VAPOURS OF ACTIVE VOLATILE AGENTS

[75] Inventors: Bernard Rabussier, Aventon; Claude Hennart, Aubervilliers, both of France

[73] Assignee: Ciba-Geigy Corporation, Ardsley, N.Y.

[22] Filed: Aug. 10, 1971

[21] Appl. No.: 170,663

[30] Foreign Application Priority Data

Aug. 12, 1970 Luxemburg.................. 61504

[52] U.S. Cl. .................... 424/78; 53/21; 239/60
[51] Int. Cl. ... A61k 15/00; A61l 9/04; A24f 25/00; B65b 1/00
[58] Field of Search ........ 239/60; 424/78; 53/21 FC

[56] References Cited
UNITED STATES PATENTS

| | | | |
|---|---|---|---|
| 2,120,204 | 6/1938 | Langhorst............................ | 239/60 |
| 2,342,406 | 1/1944 | Latta et al. ...................... | 53/21 FC |
| 2,979,268 | 4/1961 | Brun.................................... | 239/60 |
| 3,188,779 | 6/1965 | Elden................................ | 53/21 FC |
| 3,344,021 | 8/1967 | Menn et al........................... | 424/78 |
| 3,481,099 | 12/1969 | Clancy.............................. | 53/21 FC |
| 3,565,339 | 2/1971 | Curran................................ | 239/60 |
| 3,608,062 | 9/1971 | Alfes et al........................... | 239/60 |
| 3,618,283 | 11/1971 | Moore et al. ..................... | 53/21 FC |
| 3,630,446 | 12/1971 | Strengelbach et al. ............... | 239/60 |
| 3,630,665 | 12/1971 | Anderson......................... | 53/21 FC |
| 3,636,207 | 1/1972 | Bouvet................................. | 239/60 |

FOREIGN PATENTS OR APPLICATIONS

| | | | |
|---|---|---|---|
| 1,194,996 | 6/1970 | United Kingdom.................. | 424/78 |
| 1,230,259 | 12/1966 | Germany | |
| 1,072,218 | 6/1967 | United Kingdom | |
| 1,119,493 | 0/1968 | United Kingdom.................. | 424/78 |

*Primary Examiner*—Stanley J. Friedman
*Attorney, Agent, or Firm*—Wenderoth, Lind & Ponack

[57] ABSTRACT

A method for the manufacture of devices for emitting vapours of active volatile agents, in particular those which are insecticidal, insect-repellent or condition the air especially in closed spaces. Liquid containing or constituted by the active agent and a solid mass having as base a macromolecular substance other than natural cellulose are placed in a container, e.g. a sachet, which is then sealed and stored until the liquid is completely absorbed by the mass, forming a solid solution therein. The device is put in operation by opening and/or removing the container.

21 Claims, No Drawings

METHOD OF MANUFACTURE OF DEVICES FOR EMITTING VAPOURS OF ACTIVE VOLATILE AGENTS

This invention relates to a method of devices for emitting at ambient temperature and in confined spaces vapours of active insecticidal, insectifugal, or other air-conditioning agents.

The present invention relates particularly to the manufacture of permanent diffusers in the form of a solid, rigid or flexible material in which an active liquid material is impregnated in a uniform and homogeneous fashion in a polymeric matrix.

The devices according to the invention are particularly produced in the form of permanent diffusers (or evaporators) destined either for combating insects in houses or to combating bad smells or microbes either in rooms in houses or in sanitary installations. In the case of insecticidal compositions, the active material is preferably 2,2-dichlorovinyldimethyl phosphate (DDVP). In the case of compositions used for perfuming the atmosphere or for keeping a satisfactory odour in a room or for combating a disagreeable odour, the active material is formed either by essential oils or one or more constituents thereof or by artificial or synthetic odorant compositions. Or chemical compounds which have deodorizing or microbicidal properties. Furthermore one or more of these substances can be used in mixtures.

Permanent insecticidal diffusers are already known in the form of a solid, rigid or flexible mass in which the active material is DDVP, in the form of a solid solution in a polymeric material. These compositions are generally produced in the form of slabs or sheets. Permanent insecticidal diffusers of this type are described for example in French Patent Specification Nos. 1,326,385 and 1,404,681.

Permanent diffusers for perfuming the surrounding atmosphere are also known which are in the form of a solid, rigid or flexible mass in which the active odorant material is in the form of a solid solution in a polymeric matrix. These compositions are generally made in the form of slabs or sheets. Descriptions of permanent diffusers for perfuming air of this type are given, for example, in French Patent Specification Nos. 1,176,992 and 1,545,850, in Belgian Specification Nos. 683,276 and 698,411, in British Patent Specification Nos. 660,047 and 1,006,975, and in U.S. Pat. No. 2,865,806.

The best known processes for making compositions useful as permanent diffusers in which an active liquid material is distributed in homogeneous fashion in a polymeric matrix are as follows:

a. The polymer material and the active material are both dissolved in a volatile solvent therefor. According to the quantity and type of the solvent, a viscous liquid or fluid paste is obtained. The composition can be poured into a mould. By evaporation of the volatile solvent, the mixture solidifies and there is finally obtained a solid homogeneous composition which only retains a small proportion of solvent. This process is described for example in French Patent Specification No. 1,545,850.

b. The polymeric material is dispersed in the form of a sol in the active liquid material which has been previously heated. According to the type of polymer and the active material, and according to the relative weight proportions in which they are mixed, a viscous liquid or fluid paste is obtained. The composition is cast into a mould and on cooling the product solidifies and a solid homogeneous composition is obtained. An example of this process is described in U.S. Pat. No. 2,865,806.

c. The polymeric material in the form of a fine powder is coated mechanically with the active liquid material. According to the type of polymer and active material and according to the respective proportions, a dry powder or fluid paste, a so-called plastisol, is obtained. The dry powder may be formed into a solid homogeneous material by moulding, extrusion, injection, or casting as is normally the case with a powdered plastics material. In the case of a fluid paste or plastisol, the material is heated, preferably in a closed container, until the polymer gels. On cooling a solid homogeneous mass is obtained. This technique is directly inspired by the industrial methods for moulding plastics materials and for extrusion of plastified polymers. The process is described, for example, in French Patent Specification Nos. 1,326,385 and 1,404,681, Belgian Specification No. 698,411 and British Specification No. 660,407.

d. The active liquid material is incorporated into a liquid monomer or semi-polymer. The polymerisation takes place or is concluded by heating after the addition of a catalyst. A solid homogeneous composition is finally obtained. The process is described, for example, in French Patent Nos. 1,176,992, 1,326,385 and 1,404,681.

e. The plasticiser of the polymeric material is substituted by a process of diffusion and osmotic exchange by the active material in the presence of a suitable agent for promoting this osmotic exchange. This technique is indicated in French Patent No. 1,176,992.

f. A solid polymeric material, especially prepared, is immersed in a bath of the liquid active material. One example of this process is described in British Patent Specification No. 1,106,975.

The procedures of types b), c) and d) above have the disadvantage of necessitating heating of the additive material to relatively high temperatures. The treatment of hot mixtures entails losses of active material when these operations are effected in open containers or surroundings. One can naturally substantially limit these losses by working in closed containers or surroundings but in this case the investment in plant equipment becomes very onerous.

A further disadvantage of heating is the risk of degrading the active material. It is naturally well known that most essential oils are sensitive to heat and that phosphoric ester insecticides are extremely reactive at temperatures above 50°C.

The process according to type a) requires the use of an intermediate solvent which is then evaporated. The disadvantages consequent on the use of solvents as an intermediate manufacture aid are well known.

The process according to type d) above, as well as having the disadvantage of requiring heating, has the disadvantage of requiring the intimate contact with the active material of a polymerisation catalyst. It is therefore necessary to select the catalyst and the active material in such a fashion that they do not act adversely on one another.

In the process according to type e) above, the operation is slow and the diffusion of the active material dissolved in the appropriate agent for promoting the osmotic exchange is only very partial, because this involves an exchange phenomenon which is limited by an equilibrium. It is therefore necessary to remove the active material remaining in the exchange agent and the plasticiser. The process according to type f) also has the inconvenience of necessitating the preparation of a block of polymeric material starting from granules which are compressed under a pressure of 300 – 400 bars. In addition, after immersion in the bath of liquid active material, the block needs to be drained and dried to eliminate excess liquid on its surface.

The present invention provides a new process for fabrication of a system comprising, in a packing, a composition which is capable of emitting vapours of at least one volatile active material and which is constituted by:

a solid mass A which is rigid or flexible and which comprises or is formed by at least one solid organic polymeric plastics or thermoplastic material different from natural cellulose and having a molecular weight greater than 1000, optionally plasticised, and impregnated in a homogeneous and uniform fashion by an impregnation liquid B which is homogeneous and comprises or is constituted by at least one volatile active material selected from insecticidal substances, insectifugal substances, air-conditioning substances and mixtures of two or more of these, the volatile active material having a vapour pressure at 20°C of at least 0.001 torr, the polymeric substance forming the mass A being insoluble in liquid B, the process being characterised in that 1. the unimpregnated solid mass A and the liquid B are placed in the interior of a container which serves as a package, which is impermeable to liquid B and to vapours thereof, and of which the interior volume is so shaped that the liquid B is in contact with at least a part of the surface of mass A,
2. that the container is then closed sealingly, and
3. that the assembly is stored at a temperature between 0°–80°C for a minimum time period inversely proportional to the storage temperature, but for at least one day, the said part of the surface of material A placed in contact with liquid B (the impregnation surface) being sufficient to allow the penetration of 0.05 to 4 parts by weight of B per part of A into the mass A and its uniform distribution in the form of a solid solution after the said minimum period of storage.

In general, the process according to the invention includes the operation $\alpha$, $\beta$ and $\gamma$ which are noted below after manufacture of the block, sheet or other solid mass based on a polymer material which is manufactured by known process and of such shape and dimensions as are approximately those of the evaporation device ready for use:

$\alpha$ - introduction into the container of both the solid mass A of polymer material and a liquid B, this latter wetting the solid material A $\beta$ - sealed closure of the container $\gamma$ - storage of the assembly of constituents A and B in contact with one another in the sealed container for a minimum time at least equal to the impregnation time.

The process according to the invention is notable in that between the start and end of the operation of storage $\gamma$, the constitution of the contents of the container is transformed, without any exterior intervention or supply of energy, from an apparently two-phase solid liquid structure to a solid apparently one-phase structure in which the liquid B is uniformly distributed by absorption and formation of a solid solution of liquid B into the body of the polymer in the mass A. The liquid B is thus found uniformly distributed in the solid mass A and is kept there by the formation of physicochemical bonds which are of such nature that they cannot be separated other than molecule by molecule on the evaporation of the one or more volatile materials in use.

The process is also notable in that it leads to devices which are very safe both in storage and in use. According to the process of the inventionn, the absorption of liquid B into the mass A is in effect, an irreversible phenomenon, i.e., any later desorption of liquid B, for example by exudation or any slow demixture under the effect of gravity or even of pressure on the solid material is excluded, and this is the case even when, the polymeric solid material A has a spongy structure.

The polymer material of mass A consists preferably of one or more synthetic or artificial polymers or copolymers and is most preferably a thermoplastic material.

The preparation of a slab, sheet or other solid mass on a polymeric basis which is used in the process according to the invention can take place by any of the classical methods or any specific method of forming plastics materials. According to the type of polymer used and the desired shape, one of the following techniques may be used: moulding by casting, castin onto an endless belt, extrusion through a flat or annular nozzle, calendering, spinning by dry or wet extrusion, followed by weaving or agglomeration. Alternatively, special methods of fabrication can be used such as, for example, the casting of a prepolymerised monomer to which a catalyst has been added or the casting of a reactive mixture.

By means of the preceding moulding techniques there are generally obtained solid masses A directly in the form of a shaped slab of definite dimensions. By use of other techniques, a semi-finished product is obtained which may thereafter be fashioned by cutting, sawing, forming, stamping, glueing, welding, etc.

The solid polymeric material may have any shape but should have a ratio of "surface available for contact with liquid B" to "volume of the mass, " of at least 2 in the CGS system. The preferred shapes are sheets, leafs, strips, tubes, and shaped rods. Amongst these, sheets and tubes are particularly preferred.

The solid macromolecular mass A may have various structures, for example, it may be fibrous, alveolar, porous or particularly spongy, film-shaped felted or woven. Preferably, however, the polymeric mass is compact and hollow. In the case of a compact material, the ratio of impregnation surface to volume can be increased by having a non-flat surface, for example an undulating, grained, perforated or grooved surface.

Preferred embodiments employ plates of material of which the sizes are within the following ranges: small side 2–15 cm, big side 4–30, thickness 1–15 mm.

Details will now be given concerning the characteristics of the necessary operations for carrying out the process of the invention:

OPERATION $\alpha$

The form and the type of material of the container are not critical but it is necessary that its form be such that liquid B is in contact with at least a part of the surface of the mass A and that part must be sufficient to permit, after the minimum storage time, homogeneous penetration of liquid B and its uniform distribution into the mass A. The container should have dimensions sufficient to allow storage of the whole of the mass A and of liquid B. It is advisable that the solid mass A should be totally immersed in liquid B for at least the greater part of the impregnation time. In order to satisfy this last condition the container is preferably a flexible bag the shape of which is approximately that of the solid mass A. As is noted above, the amount by weight of liquid B which is to be absorbed according to the process if 0.05 – 4 parts of B per part of A. When a solid mass A having the shape of a slab, sheet or leaf, or a ribbon or shaped rod is used, this proportion is preferably between 0.1 and 0.8 parts of B per part of A. When, however, the solid mass A is of flaky, fibrous, felted or woven texture, this proportion is preferably between 0.3 to 1.5 parts of B per part of A. When a solid mass A of cellular or spongy structure is used, the proportion is preferably 0.6 to 3 parts of B per part of A.

The order in which the solid macromolecular mass A and the liquid B are introduced into the container does not influence the phenomenon of imprenation, but it is noted that it is more practicable to introduce the solid polymeric material first.

Operation β

The sealed closure of the container may be effected by one of the methods known in the packaging industry such as for example with a stopper, welding, sticking, or swaging. The preferred method is welding. According to the nature of the packaging material, welding may be effected by direct thermal transfer, by infra-red radiation or by a high frequency current. In one variation, the sealing of the sealed container is only carried out after the air in the interior has been exhausted. The container being thus empty of air, this generally supresses the risk of exudation from the device during storage. The vacuum in the container can also be effected before sealing on the condition that any re-entry of air during sealing is prevented.

Operation γ

The minimum storage time for the impregnation of the solid macromolecular mass by the whole of the liquid phase B is a function of the type and structure of the polymer material and the type of the impregnation liquid.

Furthermore, the minimum storage time decreases when:
1. the surface to volume ratio of the polymeric material increases and/or
2. the weight ratio of solid or liquid increases and/or
3. the temperature increases.
   The temperature at which storage is carried out is preferably between 20° and 40°C. The minimum storage time necessary for impregnation is preferably between 3 and 30 days.

A particularly interesting variety of the general process consists in using a solid macromolecular mass comprising a central cavity into which the liquid B to be absorbed is introduced. This variant avoids direct contact between liquid B and the walls of the container and allows of a very high impregnation speed. According to this variant, the macromolecular material is flexible. Preferably the material is in the form of a flat sachet or in the form of a tube of exterior and interior elliptical section or better still lenticular section. In the case of a tube of lenticular section, one of the ends is closed by welding, and the impregnation liquid B is then introduced into the interior of the tube, whereafter the closure of the other end by welding takes place, leaving the minimum of air in the interior of the tube. The assembly is then placed in a sealed container and stored as in the general mode of the process of the invention. After total impregnation, the polymeric material takes on substantially the shape of a flat strip or bandelet. In this variant, the preferred embodiments use a mass A in the form of a tube of lenticular section the size of which is in the following range: width (flattened tube) 2 – 6 cm, length 8 – 30 cm, wall thickeness 1 – 5 mm.

In carrying out such a variant there is used preferably a container which is formed by a multi-layer plastics foil of the type known in the packaging trade as a complex foil as is explained in more detail below. The characteristics of the necessary constituent elements for the general process will now be detailed.

The solid organic macromolecular substance A used in the devices made by the process of the invention should be insoluble in the impregnation liquid B but capable of dissolving in solid phase a minimum quantity of liquid B between 0.05 and 4 parts by weight of B per part of A. If the active material is sensitive to water, the mass A should have a hydrophobic surface in order not to absorb atmospheric humidity through its surface. Preferably the macromolecular mass is a thermoplastic material. Examples of macromolecular substances which are usable are polyacrylic resins, such as acrylic polymers and copolymers such as those of methacrylate, ethylacrylate, ethylmethacrylate and methylmethacrylate; polymers and copolymers of vinyl compounds such as the polymers and copolymers of vinylchloride, chlorinated vinylchloride, vinyl acetate, N-vinylcarbazole, vinyl pyrrolidone, vinylidene chloride, and polyvinylacetals such as polyvinyl formal, polyvinyl acetal and polyvinyl butyral; polyurethane resins formed starting from polyethers or polyesters; artificial cellulosic derivatives such as regenerated cellulose starting from viscose, cellulose nitrate, cellulose acetate, cellulose acetopropionate, cellulose acetobutyrate, cellulose propionate, cellulose butyrate; chlorinated polyolefins such as chlorinated polyethylene, chlorosulfonated polyolefins such as chlorosulfonated polyethylene; epoxy resins such as the polymers of glycidyl ethers of polyphenols and synthetic, natural and artificial elastomers such as rubber obtained from Hevea Brasiliensis, cis-1,4-polyisoprene, polybutadiene, and SBR rubber. The choice of macromolecular substance depends both on the type of active material which is to be absorbed and the conditions under which the evaporation device is to be used.

Preferably the polymeric substance is a polymer or copolymer of vinylchloride.

According to need, there may be added to the polymeric substance plasticisers, stabilisers for the polymer, inert fillers, pigments, colourants, and other known additives in the industry for making and using plastics.

Plasticisers are organic compounds having a vapour pressure less than 0.001 Torr; materials useful for plasticising polymeric substances are preferably:

1. Diesters formed between alkanols and dicarboxylated hydrocarbons, for example dialkyl adipates such as dioctyl adipate and dinonyl adipate, dialkyl sebacates such as dibutyl sebacate, dipentyl sebacate and dioctyl sebacate, dialkyl azelates such as dioctyl azelate and dialkyl phthalates such as dibutyl phthalate, dioctyl phthalate and didecyl phthalate;
2. Diesters formed between phenols which may be alkyl substituted and dicarboxylated hydrocarbons, for example diaryl phthalates such as diphenyl phthalate and dicresyl phthalate.
3. Diesters formed between cycloalkanols which may be alkyl substituted and cicarboxylated hydrocarbons, for example cyclohexyl phthalate and bis (methylcyclohexyl) phthalates.
4. Diesters formed between phenyl alkanols and dicarboxylated hydrocarbons, for example dibenzyl sebacate.
5. Diesters formed between alcane diols and monocarboxylated hydrocarbons, for example the diisobutyrate of 2,2,4-trimethylpentane-1,3-diol.
6. Triesters formed between phenols, which may be alkyl substituted and phosphoric acid, for example triphenyl phosphate, tri(4-tert-butylphenyl) phosphate and tricresyl phosphates.
7. Triesters formed between alkanols and phosphoric acid such as trioctyl phosphate.
8. Polyesters such as the polyesters of polyols such as hexane diol and carboxylic acids such as sebacic and adipic acid.
9. Polyphenols and halogenated polyphenyls such as, for example, diphenyl, terphenyls, chlorinated diphenyls, and chlorinated terphenyls.
10. Aromatic hydrocarbons bearing at least one alkyl group of from 6 – 20 carbon atoms.

In the case of a polymer or copolymer of vinyl chloride, the macromolecular substance is preferably plasticised. The plasticiser is preferably dibutylphthalate or tricresyl phosphate. The quantity of plasticiser can amount to up to 75% of the weight of the plasticised resin; preferably this proportion is from 10–65% of the weight of the plasticised resin.

The stabilisers which the macromolecular mass may contain are all those known in the plastics materials processing industry, for example derivatives of 2-hydroxybenzophenone, derivatives of 2(2-hydroxyphenyl)benzotriazole, derivatives of salicylic acid, acrylonitrile derivatives, phenolic compounds, phosphorus esters, and oxirane derivatives, and organic salts of barium, cadmium, calcium, lead, tin and zinc.

Inert fillers which the macromolecular mass may contain are for example mineral materials such as talcum, kaolin, dried clay, fossil silicas, synthetic silicas, natural non-fossil silicas, vermiculite, magnesium silicate, aluminium silicate, calcium phosphate, calcium carbonate, asbestos, powdered or fibrous carbon, powdered or fibrous glass, or organic materials such as wood flour.

The active material which constitutes part of the composition produced by the process of the present invention should have a vapour pressure at 20°C at least equal to 0.001 torr as noted before. In the case of compositions for air-conditioning or cleaning, the liquid B contains at least one volatile material chosen from substances having air-conditioning properties such as odorants, deodorants, and microbicides.

These volatile air-conditioning materials are chosen from natural essences, from chemical compounds defined by natural origin, by artificially defined compounds, from synthetic chemical compounds and from mixtures of two or more of these materials.

As non-limitative examples, the following natural essences should be noted: anise, lavender spike, lemon citronella, eucalyptus, geranium, lavender, lavender flower, lemon grass, mandarin, mint, orange, petitgrain, pine, khus-khus, vetyver, rosemary, copal, terebinth, pine needles, cedar, thuya, cypress, juniper berries, tuberose, pimenta, iris, violet, ginger, cardamon, pepper, beetle, myrica, hop, sandalwood, neroli, basil, bergamot, seville orange, carraway, cummin, fennel, clove, marjoram, myrtle, patchouli, wild thyme, thyme, camphor, cinammon, rosewood, bay, laurel leaves, rose, bitter almond, acacia, laurel berries, anise bark, illicium, and jasmine oils. Furthermore there are chemically defined compounds, both natural or artificial or synthetic, for example the terpenes, such as terpinoline, limonene, pinene, camphene, myrcene, cymene, tropinene, cedrene, norcamphene, and volatile esters such as bornyl acetate, isobornyl acetate, the acetate of 6-methyl-5-hepten-2-yl, dihydro-nordicyclopentadienyl acetate, linalyl acetate, terpenyl acetate, linalyl propionate, methyl salicylate and the esters of linalol, geraniol, nerol, citronellol, terpineol, menthol, borneol, and benzyl alcohol, cresols, phenylpropyl alcohol, phenyl ethyl alcohol, and volatile aldehydes such as citral, so-called "Agrumenaldehyde" (Haarmann and Reimer), citronellal, cuminic aldehyde, anisic aldehyde, heliotropine, vanilline, and volatile acetals such as the glycol acetal of 2,4-dimethyltetrahydrobenzaldehyde, the dimethyl acetal of phenyl acetic aldehyde, "pentranol-diethyl-acetal" (Dragoco), "Resedyl acetal" (Dragoco), the pelargonic, capric and lauric acetals, and those of citral, citronellal, and the following acetals: benzoic, cuminic, phenylacetic, cinnamic, salicylic, anisic, methoxycinnamic; furthermore the volatile hydroxylated compounds such as menthol, terpineol, linalol, geraniol, citronellol, thymol, chavicol, carvacrol, eugenol, phenols, cresols, halogenated phenols, benzyl alcohol, cinnamic alcohol, phenylethyl alcohol, and volatile ketones such as methylheptyl ketone, methylhexyl ketone, methylnonyl ketone, methylheptenone, carvone, pulegone, isopulegone, menthone, camphor, fenchone, thuyone, ionones, "Musk ketone" (Nitine Inc), benzophenone, volatile ethers such as diphenyloxide, and alcohol ethers such as 3,6-dioxaoctanol, 3', 6'-dioxadecanol, phenoxyethanol, 8-phenyl-3,6-dioxaheptanol, and acetylenically unsaturated compounds such as methyl-heptine-carbonate and ethyl-octine-carbonate and aromatic compounds preferably diphenyl compounds such as diphenylmethane, diphenyl and its derivatives, and iodine.

In the case of insectifugal compositions, the active liquid contains at least one active insectifugal material such as, for example, citronellol, alkyl mandelates such as hexylmandelate, isobornylmorpholinoacetate, dimethylcarbamate, dimethylphthalate, lower alkyl tartrates, such as diisoipropyl tartrate, 2-ethylhexane-1,3-diol, 2-cyclohexylcyclohexanol, 2-phenylcyclohexanol, dimethylhexahydrophthalate, diethylhexahydrophthalate, pentane-1,5-diyl dipropionate, β-tetralol, lower alkyl mandelates such as isobutyl mandelate, 1,2,3,6-tetrahydrophthalimide, N-amylbutoxyacetamide, and formamides and acetamides N,N-disubstituted by lower alkyl groups such as dimethyl formamide, diethyl formamide, dimethyl acetamide, diethyl acetamide, dipropyl acetamide, and dibutyl formamide.

In the case of insecticidal compositions, the liquid B preferably contains at least one volatile phosphoric ester insecticide according to formula I

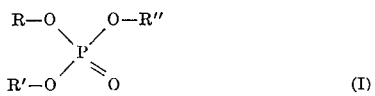

in which R and R' are the same or different and are alkyl groups of from 1 to 4 carbon atoms, and R'' is a group of formula II

in which X is halogen, for example fluorine, chlorine or bromine, and R''' and R'''' are the same or different and are each hydrogen, halogen, methyl or ethyl, or R'' represents a group defined by formula III

in which R''', R'''' and X have the meanings which have just been given.

As non-limiting examples of phosphoric esters corresponding to the general formula noted above, the following should be noted:

2,2-dichlorovinyldimethyl phosphate;
2,2-dichlorovinyldiethyl phosphate;
2,2-dichlorovinyldipropyl phosphate;
2,2-dichlorovinyldibutyl phosphate;
2,2-dibromovinyldimethyl phosphate;
2,2-dibromovinyldiethyl phosphate;
2,2-dibromovinyldipropyl phosphate;
2-bromo-2-chlorovinyldimethyl phosphate;
2-bromo-2-chlorovinyldiethyl phosphate;
2,2-dichlorovinylmethylethyl phosphate;
1,2-dibromo-2,2-dichloroethyldimethyl phosphate;
1,2-dibromo-2,2-dichloroethyldiethyl phosphate;
1-bromo-2,2,2-trichloroethyldimethyl phosphate;
1-bromo-2,2,2-trichloroethyldiethyl phosphate;
1,2,2,2-tetrabromoethyldimethyl phosohate;
1,2,2,2-tetrabromoethyldiethyl phosphate;
1,2-dibromo-2,2-dichloropropyldimethyl phosphate;
1,2-dibromo-2,2-dichloropropyldiethyl phosphate;
2,2-dichloro-1-methylvinyldimethyl phosphate;
2,2-dichloro-1-methylvinyldiethyl phosphate.

In the process according to the invention, the preferred phosphoric ester is 2,2-dichlorovinyldimethyl phosphate, known as DDVP and DICHLORVOS.

The liquid B comprises at least one active material chosen from those described above and optionally one or more adjuvants chosen from stabilisers for the active material, volatile diluents, colourants, plasticisers for the polymeric material. These adjuvants should be soluble in liquid B.

The liquid volatile diluents are preferably used in a proportion by weight of between 0.1 and 3 parts of diluent per part of active material; they should possess a vapour pressure at 20°C between 0.001 Torr and 30 Torr and preferably between 0.01 and 5 Torr; they are preferably chosen from esters formed between carboxy-alkanes and alkanols, for example methyl caprate, ethyl caprate, propyl caprates, methyl laurate, ethyl caprilate, propyl caprilates, and butyl caprilates, and from diesters formed between dicarboxylated hydrocarbons and alkanols such as for example dimethylphthalate, dimethylsuccinate, diethylsuccinate, dimethylmaleate, diethyl maleate, dimethyl malonate, diethyl malonate, dibutyl malonates and dipropyl malonates. The volatile liquid diluent may also be chosen from aromatic hydrocarbons such as xylenes, propyl benzenes, butyl benzenes, durenes, and tetraline, or from amongst halo alkanes such as chloro-octanes, 1-chlorodecane, 2-chlorododecane, bromo-octanes, dibromopropanes, dibromobutanes, 1,2,3-tribromopropane and hexachloroethane, as well as from halogenated aromatic hydrocarbons such as dichlorobenzenes and bromotoluenes. The diluent may also be chosen from aliphatic, cycloaliphatic, aromatic and arylaliphatic ethers such as anisole, phenetole, homophenetole, chlorinated anisoles, and methoxytoluenes, or it can be chosen from diethers such as 3,6-dioxaoctane, 4,7-dioxadecane, 5,8-dioxadodecane, and dimethoxybenzenes. Furthermore triethers may be used such as 2,5,8-trioxanonane 3,6,9-trioxaundecane, 4,8-dimethyl-3,6,9-trioxaundecane, 3,6,9-trioxatridecane, 5,8,11-trioxapentadecane, and trimethoxybenzenes. Tetraethers and pentaethers may also be used such as 2,5,8,11-tetraoxadodecane, and 2,5,8,11,14-pentaoxapentadecane. Dioxanes can also be used such as paradioxane, 2,3-dichloroparadioxane, dimethyl metadioxanes, trimethylmetadioxanes, 4-methylmetadioxane, 5-hydroxyethyl-4,4-dimethylmetadioxane, 2,4-dimethylmetadioxan-6-ol and 6-acetoxy-2,4-dimethylmetadioxane. The diluent may also be chosen from hydroxylated aliphatic, cycloaliphatic, aromatic or araliphatic hydrocarbons, for example octanols, primary heptanol, primary decanol, benzyl alcohol, phenyl propanols, phenyl ethanols, methyl cyclohexanols, and 3,3,5-trimethylcyclohexanol. Aliphatic, cycloaliphatic, aromatic and arylaliphatic ketones can also be used, for example, 2-octanone, 5-nonanone, 3-nonanone, 2,6-dimethylheptan-4-one, acetonyl, acetone, methyl cyclohexanones, isophorone, 3,3,5-trimethylcyclohexanone, acetophenone, propiophenone, and methoxyacetophenone.

Plasticisers used in liquid B are preferably used in a proportion by weight of between 0.1 and 10 parts per part of active material. They may be chosen from various materials useful for plasticising macromolecular materials such as those noted above.

Stabilisers for the active material may be necessary when the active material is, for example, an insecticidal phosphoric ester such as defined above, or when it is an air-conditioning substance, liable to degradation or other change. Useful stabilisers are, for example, the phenolic compounds such as those defined in French Patent Specification No. 1,326,385, expoxidised compounds such as those defined in French Patent Specification No. 1,187,378, such as epoxidised oils, particularly epoxidised soya oil, halogenated epoxy-alkanes, and alkyl epoxy stearates. Amines or heterocyclic nitrogen compounds as defined in French Patent Specification No. 1,379,851 may also be used, as may the azo compounds and their metalliferous derivatives disclosed in German Offenlegungsschrift 2,011,629.

The material of the container should be formed of a substance or assembly of substances enveloping the impregnation liquid in an impermeable fashion. Metals can be used such as tin plate or aluminum. Very impermeable plastics materials such as polyundecanamide or high density polyethylene may also be used. According to a preferred embodiment, the material of the container is formed by a multi-layer laminar assembly which is heat-weldable on one face and which is of the type known in the packaging trade as a complex. Such complexes are described, for example, in French Patent Specification Nos. 1,568,983 and 1,580,871. numerous types of complex are known and the number and type of the individual layers is very variable. Among the various layers in various orders there may be found layers of: paper, aluminium, polyethylene, polyamide, polyesters, copolymers with a high content of polyvinylidene chloride, oriented polypropylene, hot melt resins and ionomeric resins, (i.e. polymeric resins of the polyalkylene type in which metal molecules are bonded to the carbom atoms in the chain)

Particularly useful complexes, for example, have the following layers in the order given below:
  polyethylene/aluminium;
  polypropylene/polyethylene/cellulosic film treated with polyvinylidene chloride and polyethylene;
  polyethylene/aluminium/cellulose acetate;
  oriented polypropylene/polyvinylidene chloride/hot melt resin (MILPRINT process)
  ethylene vinyl acetate copolymer/polyethylene/ethylene vinyl acetate copolymer/polyvinylidene chloride/oriented polypropylene (CROWN-ZELLERBACH process)
  polyethylene/polyester/aluminium/paper;
  ionomeric resin/aluminium/ionomeric resin/paper (DU PONT DE NEMOURS process);
  ionomeric resin/low density polyethylene (DU PONT DE NEMOURS process);
  ionomeric resin/polyhexamethylene adipamide (DU PONT DE NEMOURS process);
  ionomeric resin/aluminium/polyester "MYLAR 50A" (DU PONT DE NEMOURS process);
  polyethylene/polyhexamethylene adipamide;

These complexes may be obtained by known processes of co-extrusion, photo deposition in a gaseous phase under vacuum with polymerisation by ultraviolet rays, induction, or drying by microwaves.

For use in the manufacturing process according to the present invention, it is preferable to choose a complex of which there is no risk of the layers delaminating on contact with the liquid B.

The following experiments and non-limitative examples will serve to illustrate the invention further:

EXPERIMENT A

A solid flexible mass of polyvinyl chloride was used which had been plasticised by dibutylphthalate, the content of plasticiser being around 36%. The polyvinyl chloride had a density of about 1.42, a Shore hardness of about 78, and a Vicat softening point of about 80. This material was shaped by extrusion into a tube of which the interior and exterior cross-sectional contours were lenticular; the exterior width was 28 mm and its greatest thickness was 3.2 mm for a length of 140 mm. The interior walls were in contact with one another over their whole surface and had a breadth of 20 mm. The volume of one tube, calculated by immersion into a graduated flask containing water, was 12.5 cm$^3$. These tubes wee welded at one end to a length of 3 mm by a high frequency process. 6.5 g of DDVP were then introduced into each tube by means of the end left open. This end was then closed by high frequency welding over a length of 3 mm. The surface in contact with the DDVP was therefore 53.6 cm$^2$ and the ratio of the surface area to volume was about equal to 4.5.

Devices thus manufactured were each placed into a sealed sachet which was emptied of air before closure and which was formed starting from a sheet comprising a 35 microns-thick layer of polyethylene and a 30 microns-thick layer of aluminium, the latter being toward the outside of the sachet. The interior dimensions of the sachet were 40 mm × 160 mm. After storage at a temperature of about 40°C for 120 hours, the sachets were opened and the strips were cut into several parts. It was found that no free liquid was present any more. An examination which was carried out at the end of 24 hours showed that, even at that early stage, 92% of the DDVP has been absorbed.

The various cut up parts were analysed by gas phase chromatography after dissolving the mixture in cyclohexanone acetone (5:1). These analyses showed that the content of DDVP was practically the same in each out part and equal to 27.3 ± 0.5%.

EXPERIMENT B

Pieces of plasticised polyvinyl chloride as used in Experiment A were used in this experiment, with the exception that the content of dibutylphthalate was about 32%. A mixture as follows was introduced into the interior of each tube:

| | |
|---|---|
| DDVP | 6.5 |
| dibutylphthalate | 1.5 g |

The filled tubes were then welded and placed in sachets as noted in Example A. After storage for 360 hours at a temperature of 40°C the sachets were opened and the resulting strips cut up into several sections; this showed that practically no free liquid was left. Examination after 48 hours storage showed that even at this time 88% of the mixture had already been absorbed.

The various cut-up portions were analysed by gas phase chromatography as in Experiment A and the following results were found:

| | |
|---|---|
| DDVP content | 26.6 ± 0.4% |
| dibutylphthalate content | 11.5 ± 0.3% |

EXPERIMENT C

Strips made of plasticised polyvinyl chloride as used in Experiment A were used but they had no cavities in this case. The strips were each introduced into a sachet as described in Experiment A and 6.5 g of DDVP were added into the sachet before closure. The volume of the polymeric material was the same as that used in Experiment A. The contact surface with the active liquid was 80 cm$^2$ and the ratio surface to volume was therefore about 6.4.

After 240 hours storage at 40°C the sachets were opened and it was determined that substantially all the DDVP had been absorbed by the strips of polyvinyl chloride.

The results of experiments A, B and C show that DDVP is completely absorbed and very regularly distributed in the polyvinyl chloride when operating according to the process provided according to the present invention.

EXPERIMENT D

Devices manufactured as noted under Experiments A, B and C comprising a body of polyvinyl chloride, a liquid B based on DDVP and a container formed by a sachet were exposed at a temperature of 40°C for 3 months. A similar series of identical devices were kept for 1 year at ambient temperature.

The content of the sachets was then analysed to determine the content of DDVP. This content was found in all cases to be between 97 – 100% of the content originally introduced.

This experiment shows that the compositions provided according to the invention ensure substantially perfect conservation of DDVP during storage.

EXPERIMENT E

Compositions constituting insecticidal diffusers produced as noted in Experiment A and having been stored in a sachet for 240 hours at 40°C were taken out of their sachets and suspended in a room temperature of which was maintained at 20 ± 2°C and relative humidity about 70. At the end of 24 hours and thereafter for seven days the diffusers were weighed to determine the quantity of DDVP evaporated. The average daily weights thus determined are indicated below:

```
1st day  :    205 ± 20 mg
8th day  :    180 ± 18 mg
15th day :    138 ± 14 mg
22nd day :    107 ± 11 mg
29th day :     85 ±  8 mg
38th day :     64 ±  6 mg
43rd day :     50 ±  5 mg
50th day :     40 ±  4 mg
```

These results show that the compositions prepared according to the process according to the present invention allow a permanent evaporation of insecticide to be obtained over a long period of time.

EXPERIMENT F

Some of the diffusers which had been used as noted in Experiment E were dissolved in a mixture of cyclohexanone and acetone (5:1) in order to enable the measurement of how much DDVP had been destroyed by hydrolysis after 50 days exposure in humid air. The analysis showed that the quantity of DDVP thus decomposed was between 110 – 165 mg i.e. 2.1 ± 0.4% based on the weight of DDVP originally used.

A second series of the devices were allowed to continue functioning for a total period of 6 months and the quantity of DDVP destroyed by hydrolysis was measured. This quantity was determined to be between 235 – 330 mg i.e. 4.3 ± 0.7% based on the weight of DDVP originally used. The whole of the DDVP which had not been destroyed had by that time evaporated. These results show that the compositions made according to the invention protect the DDVP satisfactorily against the destructive influence of the humidity of the air.

EXPERIMENT G

The diffusers used in Experiment E were tested in order to measure their insecticidal efficacy against houseflies under under the following conditions: The flies were released in a room of volume 30 m$^3$, which had a temperature of 25°C at the time at which the diffuser was placed there. The time expressed in minutes necessary to obtain the fall of 50% of the flies (KD 50) was noted as the percentage of fallen flies (KD %) at the end of one hour.

The average of these results, calculated for ten different experimental diffusers, are given in the following table:

|  | KD 50 (in minutes) | KD % (in 1 hour) |
|---|---|---|
| 1 day | 30 | 98 |
| 8th day | 36 | 97 |
| 15th day | 38 | 95 |
| 22nd day | 40 | 90 |
| 29th day | 40 | 87 |
| 36th day | 42 | 82 |
| 43rd day | 43 | 72 |
| 50th day | 52 | 62 |

The results of the present experiment show that a permanent insecticidal action can be obtained with compositions made according to the process of the invention. In the present case, such an action was maintained for seven weeks utilizing a quantity of active material as small as 6.5 g.

EXPERIMENT H

Experiment C was carried out but with replacement of the plasticised polyvinyl chloride with an equal volume of non-plasticised polyvinyl chloride or other polymeric substance to which DDVP was added at a ratio of 1 part by weight of this ester per 3 parts of the polymeric material. The unplasticised polyvinyl chloride had a density of about 1.40 g/cm$^3$, a Shore hardness of about 74 and a Vicat softening point of about 77.

The various polymeric substances used are indicated below:

H-1 : ethylene vinylacetate copolymer (72:28) of average viscosity (intrinsic viscosity = 0.85, 0.25 g in 100 ml of toluene at 30°C)

H-2 : ethylene vinylacetate copolymer (72:28) of low viscosity (intrinsic viscosity = 0.63; 0.25 g in 100 ml toluene at 30°C).

H-3 : ethylene vinylacetate copolymer (76:24) of average viscosity (intrinsic viscosity = 0.78; 0.25 g in 100 ml toluene at 30°C).

H-4 : low viscosity polyvinylacetate (10 cp for 20 g in 100 g of a mixture of ethanol and ethylacetate 85:15 at 20°C).

H-5 : very low viscosity polyvinylacetate (6 cp for 20 g in 100 g of ethanol ethylacetate mixture 85:15 at 20°C).

H-6 : acrylonitrile vinylidenechloride copolymer of very high viscosity (1000 cp at 20 g in 100 g methyl ethyl ketone at 20°C).

H-7 : vinylacetate vinylpyrrolidone copolymer (40:60).

H-8 : polyvinylchloride (non plasticised) containing 10% of chlorinated polyethylene. This product had a density of about 1.5 g/cm$^3$ and a chlorine content of about 65% by weight.

H-9 : styrene butadiene copolymer (60:40).

H-10: polyethylacrylate of average viscosity (300 cp at 45% in toluene at 25°C).

H-11: polyethyl acrylate of high viscosity (800 cp at 40% in toluene at 30°C). (all above-given rations are by weight).

After storage for 2 weeks at a temperature of 40°C, the containers were opened and the quantities of DDVP absorbed by the material were measured by analysis. The results obtained showed that in every case the DDVP was completely absorbed by the polymeric material. This indicates how numerous the organic polymeric materials are which can be used in the process according to the invention.

EXPERIMENTS I AND J

Experiment H was repeated with various polymeric materials but using as active liquid either DDVP alone or a mixture of DDVP and a volatile diluent at a ratio of 7 parts DDVP per 3 parts volatile diluent.

The mixtures thus prepared were denoted as follows:

| | | |
|---|---|---|
| I-1 | DDVP | 7 parts |
| | dimethylsuccinate | 3 parts |
| I-2 | DDVP | 7 parts |
| | diethylsuccinate | 3 parts |
| I-3 | DDVP | 7 parts |
| | dimethylmaleate | 3 parts |

The organic polymeric substances were used at a rate of 2.1 parts by weight per part by weight of active liquid. These polymers were chosen from those enumerated in Experiment H and from H-12: polyvinylacetate of very high viscosity (30 cp at 5 g in 100 g of ethanol-/ethylacetate mixtured 85:15 at 20°C.

EXPERIMENT I

The following table indicates the time period in days at the end of which the whole of the liquid mixture was completely absorbed by the polymeric material at a temperature of 40°C.

| | I-1 | I-2 | I-3 |
|---|---|---|---|
| H-1 | 20 | 5 | 12 |
| H-2 | 12 | 7 | 12 |
| H-3 | 12 | 2 | 8 |
| H-4 | 3 | 3 | 3 |
| H-5 | 2 | 2 | 2 |
| H-6 | 2 | 2 | 2 |
| H-7 | 2 | 2 | 2 |
| H-8 | 12 | 12 | 5 |
| H-11 | 12 | 12 | 10 |

EXPERIMENT J

Experiment H was repeated using various polymeric materials but using in place of DDVP alone, a mixture of DDVP (54%) a volatile diluent (23%) and a plasticiser (23%).

Mixtures of this type were used as follows (percentages by weight):

| | | |
|---|---|---|
| J-1 | DDVP | 54% |
| | dimethylsuccinate | 23% |
| | dibutylphthalate | 23% |
| J-2 | DDVP | 54% |
| | diethylsuccinate | 23% |
| | dibutylphthalate | 23% |
| J-3 | DDVP | 54% |
| | dimethylmaleate | 23% |
| | dibutylphthalate | 23% |

The polymeric substances were used at a rate of 16.2 parts by weight per 10 parts by weight of active liquid. The polymers used were those noted in Experiments H and I. The following table indicates the time in days at the end of which the whole of the liquid mixture had been completely absorbed into the polymeric material at a temperature of 40°C.

| | J-1 | J-2 | J-3 |
|---|---|---|---|
| H-1 | 12 | 8 | 12 |
| H-2 | 8 | 8 | 12 |
| H-3 | 2 | 8 | 5 |
| H-4 | 3 | 3 | 3 |
| H-5 | 2 | 2 | 2 |
| H-6 | 2 | 12 | 12 |
| H-7 | 2 | 2 | 8 |
| H-8 | 15 | 3 | 5 |
| H-12 | 8 | 3 | 7 |

The results of Experiments I and J show that a volatile diluent and a plasticiser can be added to DDVP when carrying out in practice the process according to the invention.

EXPERIMENT K

Parallelepiped blocks of polyvinylchloride as used in Experiment A and plasticised by dioctylphthalate content of plasticizer (54.5%) thereof were used in this experiment. The plates had a length of 150 mm, breadth of 30 mm and thickness of 4 mm, giving a surface-to-volume ratio of 5.8.

As container, rectangular sachets were used made of two complex sheets welded one to the other along the two larger sides and one of the smaller sides. The complex sheet comprised successive layers of: polyethylene (40 microns)/polyester (12 microns)/ aluminium (12 microns)/paper (50g/m$^2$), the last noted being on the outside. The polyethylene was obtained by a high pressure process and had a molecular weight of about 17,000 and a density of about 0.93 g/cm$^3$. The polyester was a polyethyleneglycolterephthalate. Into each sachet there was introduced before closure a strip of polyvinylchloride and 7 g linalyl acetate. The open side of the sachet was then sealed by welding and care was taken to enclose only a very small volume of air in the interior. After closure, the interior dimensions of the sachets were 157 × 37 × 5 mm. After storage in flat position for 22 days at a temperature of about 20°C, the sachets were opened and the strips were cut into five portions across their width. It was thereby determined that there was practically no longer any free liquid in the interior of the sachet. Various cut-rip portions were analysed by gas phase chromatography, after dissolving in a cyclohexanone acetoine mixture (5:1). The analyses showed that the content of linalyl acetate was practically the same in each portion part and was equal to 22.2 ± 0.5%.

EXPERIMENT L

Flat tubes of plasticised polyvinyl chloride were used as described in Experiment A, but in which the content of dibutylphthalate was about 31%. 8.5 g of citral were introduced into the interior of each of these tubes. The filled tubes were then closed by high frequency welding taking care to enclose only a very small volume of air in the interior. Devices thus prepared were each enclosed in a sealed sachet formed starting from a complex sheet such as described in Experiment K. After storage in flat position for 8 days at a temperature of 40°C the sachets were opened and the tubes were cut into five parts in the direction of their width. This operation allowed to demonstrate the fact that there was practically no longer any free liqud in the interior of the flattened tube. The various cut-up portions were analysed by gas phase chromatography as in Experiment K. The content of citral found was 35 ± 0.7%.

EXPERIMENT M

Experiment L was repeated but using in the interior of the tube 4.5 g of a lavender composition (reference 1239 of the French Company Daniel Blayn et Cie). After storage in flat position for 8 days at a temperature of 40°C, the sachets were opened and the tubes cut into three parts in the direction of their width. By this operation it was determined that practically no free liquid remained in the interior of the flattened tube. The three cut-up portions were allowed to evaporate in the same surroundings. The evaporation curve of the perfume over 20 days was established for each part by weighing. The three curves obtained were identical on all points.

The results of Experiments K, L and M show that active air-conditioning materials chosen from chemically defined odorant compounds and compositions are completely absorbed and very regularly distributed in the polyvinylchloride when operating according to the process of the present invention.

EXPERIMENT O

Diffusers produced as in Experiment L and which had been stored for 48 days at ambient temperature in their containers were extracted from their sachets and suspended in a room the temperature of which was kept at 22°± 1°C. The curves of weight loss allowed the determination of the quantity of citral diffused into the ambient air. The table below gives the average rate of evaporation at the end of each week:

```
1st week : 175 ± 25 mg/day
2nd week : 165 ± 20 mg/day
3rd week : 135 ± 20 mg/day
4th week : 110 ± 15 mg/day
5th week :  85 ± 15 mg/day
6th week :  65 ± 10 mg/day
7th week :  50 ±  8 mg/day
8th week :  35 ±  8 mg/day
```

These results show that the compositions prepared according to the process of the present invention allow a permanent evaporation to be obtained over a long period of time of the active air-conditioning material.

EXAMPLES 1 to 10

Insecticidal compositions prepared according to the manufacturing process of the present invention using a solid parallelepiped mass comprising polyvinylchloride as organic polymeric material, unmodified or modified by chlorinated polyethylene and optionally coloured with a pigment, and an insecticidal liquid B comprising DDVP as active material and in several cases a volatile diluent, for example methyl laureate, methyl caprate, diethyl succinate, or dimethyl maleate and/or one or more stabilisers chosen from epoxides, phenols and azoic compounds were prepared. The container was a sachet of complex material comprising a foil of aluminum separated from the composition by means of a foil of polyethylene as noted in Experiment A or by a double layer of polyethylene/polyester as described in Experiment K. The interior dimensions (breadth and length) were greater to an extent of 20 – 30% than those of the solid polymeric material. Air was exhausted from the sachet before closure.

In these and all subsequent examples, amounts are given in parts by weight unless expressly stated otherwise. Dimensions are in the corresponding units of the CGS system (grams compound to millimeters).

The various examples are expressed in tabular form as follows:

TABLE I

| Example No: | | 1 | 2 | 3 | 4 | 5 | 6 | 7 | 8 | 9 | 10 |
|---|---|---|---|---|---|---|---|---|---|---|---|
| Length | | 200 | 200 | 150 | 150 | 150 | 150 | 150 | 200 | 200 | 200 |
| Breadth | | 80 | 80 | 100 | 100 | 100 | 100 | 100 | 80 | 80 | 80 |
| Thickness | | 1 | 1 | 2 | 2 | 3 | 3 | 2 | 1 | 3 | 2 |
| SOLID MATERIAL Constituents: | | | | | | | | | | | |
| polyvinylchloride (density 1.38, 1.48 g/cm³) | | | | | | | | | | | |
| Shore hardness 70-90 Vicat softening point 75-85 | | 83 | 76 | 79 | 63 | 67.5 | 57 | 70 | 65 | 54 | 45 |
| Chlorinated polyethylene (as in polymer H8) | | 9 | 12 | — | 6 | — | 6 | — | 7 | — | — |
| red pigment (made by CIBA-GEIGY A.G. colour index No. 15850 (red pigment 57-59)) | | 0.1 | 0.2 | — | — | — | — | — | — | 0.2 | 0.2 |
| green pigment (made by CIBA-GEIGY A.G. colour index No. 74260 (green pigment 7)) | | — | — | — | 0.2 | — | 0.3 | — | — | — | — |
| ACTIVE LIQUID | | | | | | | | | | | |
| DDVP | | 6 | 10 | 14 | 20 | 22 | 22 | 25 | 25 | 35 | 47 |
| methyl laurate | | — | — | 6.5 | — | — | — | — | — | — | — |
| methyl caprate | | — | — | — | 10 | — | — | — | — | — | — |
| diethyl succinate | | — | — | — | — | 10 | — | 5 | — | 10 | — |
| dimethyl maleate | | — | — | — | — | — | 12 | — | — | — | 6 |
| epoxidised soya oil | | 1.9 | 1.6 | — | — | — | 2 | — | 3 | — | 1.2 |
| 4-tertbutylphenol | | — | — | 0.5 | — | — | — | — | — | — | 0.6 |
| azobenzene | | — | 0.2 | — | 0.8 | 0.5 | 0.7 | — | — | 0.8 | — |
| IMPREGNATION | Temperature in °C | 70 | 80 | 55 | 50 | 50 | 40 | 70 | 80 | 60 | 75 |
| STORAGE | duration in days | 10 | 10 | 12 | 12 | 10 | 15 | 12 | 15 | 10 | 8 |

EXAMPLES 11 to 20

Insecticidal compositions prepared according to the manufacturing process of the present invention comprised a solid parallelepiped mass containing polyvinyl chloride as organic polymeric material and a plasticiser, being dibutylphthalate, dioctylphthalate, tricresylphosphate or diisooctyladipate, with, in certain cases a coloured pigment, and an active insecticidal liquid comprising SSVP as active material and in some cases one or more stabilisers chosen from epoxide, phenols and azoic compounds.

The container in each case was a complex sachet as given in the previous examples. Examples are given in tabular form in Table II.

lelipiped mass of organic polymeric material of an ethylene vinylacetate copolymer, polyvinylacetate or a vinylacetate vinylchloride copolymer and in some cases

TABLE II

| Example No: | 11 | 12 | 13 | 14 | 15 | 16 | 17 | 15 | 19 | 20 |
|---|---|---|---|---|---|---|---|---|---|---|
| Length | 60 | 100 | 60 | 60 | 250 | 250 | 250 | 220 | 200 | 250 |
| Broadth | 50 | 50 | 50 | 50 | 60 | 60 | 60 | 60 | 50 | 65 |
| Thickness | 5 | 5 | 4 | 4 | 5 | 4 | 4 | 4 | 4 | 4 |
| SOLID MATERIAL Constituents: | | | | | | | | | | |
| polyvinylchloride (as in Examples 1–10) | 76.5 | 58.7 | 62 | 56 | 59 | 60 | 62 | 44.5 | 40 | 6 |
| dibutylphthalate | — | 25 | — | — | — | — | — | 27.5 | — | — |
| dioctylphthalate | 15 | — | — | — | — | — | — | — | — | — |
| tricresylphosphate | — | — | 17.5 | — | — | — | 10 | — | 29 | — |
| diisooctyladipate | — | — | — | 23 | 18 | 17 | — | — | — | 11 |
| yellow pigment(made by CIBA-GEIGY A.G. colour index No. 21100 (pigment yellow 13)) | 0.5 | 0.3 | 0.3 | 0.4 | 0.5 | — | 0.5 | — | — | — |
| red pigment (made by CIBA-GEIGY A.G. colour index No. 12120 (pigment red 3)) | — | — | 0.2 | — | — | 0.3 | — | 0.5 | — | — |
| ACTIVE LIQUID | | | | | | | | | | |
| DDVP | 8 | 15 | 18 | 20 | 20.5 | 22 | 25 | 27.5 | 30 | 23 |
| octylepoxystearate | — | 1 | — | — | — | — | 2 | — | — | — |
| epichlorohydrin | — | — | 2 | — | 1.5 | — | — | — | — | — |
| 2,6-ditertbutyl-4-methylphenol | — | — | — | — | 0.5 | 0.7 | — | — | — | — |
| azobenzene | — | — | — | 0.6 | — | — | 0.5 | — | 11 | — |
| IMPREGNATION Temperature in °C | 20 | 30 | 40 | 40 | 40 | 40 | 40 | 30 | 50 | 40 |
| STORAGE Time in days | 20 | 20 | 15 | 15 | 20 | 20 | 20 | 30 | 15 | 20 |

EXAMPLES 21 to 30

Insecticidal compositions were prepared according to the process of the invention using constituents as noted in Examples 11 to 20 and furthermore a volatile solvent included in liquid B, this being dimethylsuccinate, diethylsuccinate or methyllaurate. The examples are shown in tabular form in TABLE III.

a pigment, a content of glass fibre and a plasticiser, which may be dibutylsebacate, triphenylphosphate, or dioctylphthalate. The insectical liquid B comprised DDVP as active material and in several cases a volatile diluent, which could be selected from diethylsuccinate or dimethylmaleate, and one or more stabilisers, for example, an epoxide, a phenol or an azoic compound.

TABLE III

| Example No: | 21 | 22 | 23 | 24 | 25 | 26 | 27 | 28 | 29 | 30 |
|---|---|---|---|---|---|---|---|---|---|---|
| Length | 60 | 100 | 60 | 60 | 250 | 250 | 250 | 250 | 250 | 200 |
| Breadth | 50 | 50 | 50 | 50 | 60 | 60 | 60 | 60 | 60 | 50 |
| Thickness | 5 | 5 | 4 | 4 | 5 | 4 | 4 | 4 | 4 | 4 |
| SOLID MATERIAL | | | | | | | | | | |
| polyvinylchloride (as examples 1 – 10) | 42 | 46 | 70 | 62 | 60 | 60 | 60 | 55.5 | 51 | 54 |
| dibutylphthalate | 40 | 30 | — | — | — | — | — | 11 | — | — |
| dioctylphthalate | — | — | 10 | — | 9 | — | — | — | 8 | — |
| tricresylphosphate | — | — | — | 12 | — | — | — | — | — | 5 |
| diisooctyladipate | — | — | — | — | — | 9 | 9 | — | — | — |
| yellow pigment (made by CIBA-GEIGY A.G. colour index No. 21095 (pigment yellow 14)) | — | — | — | — | — | 0.5 | 0.5 | — | 0.3 | — |
| orange pigment (made by CIBA-GEIGY A.G. colour index No. 21110 (pigment orange 13)) | — | — | — | 0.5 | 0.5 | — | — | 0.5 | — | — |
| ACTIVE LIQUID | | | | | | | | | | |
| DDVP | 6 | 12 | 15 | 20 | 20 | 20.5 | 20.5 | 22 | 25 | 30 |
| dimethylsuccinate | 12 | — | — | — | — | 9 | — | — | 15 | 10 |
| diothylsuccinate | — | 12 | 5 | — | — | — | 9 | 11 | — | — |
| methyllaurate | — | — | — | 5 | 9 | — | — | — | — | — |
| octylepoxystearate | — | — | — | — | 1 | — | — | — | — | — |
| epichlorohydrin | — | — | — | — | — | 0.5 | 1 | — | — | — |
| betanaphthol | — | — | — | — | — | 0.5 | — | — | — | — |
| azobenzene | — | — | — | 0.5 | 0.5 | — | — | — | 0.7 | 1 |
| IMPREGNATION Temperature in °C | 80 | 5 | 10 | 20 | 40 | 40 | 30 | 30 | 30 | 40 |
| STORAGE Time in days | 2 | 60 | 60 | 30 | 15 | 12 | 30 | 30 | 25 | 30 |

EXAMPLES 31 to 40

Insecticidal compositions were prepared according to the process of the invention using a solid parallelipiped mass of organic polymeric material of an ethylene vinylacetate copolymer, polyvinylacetate or a vinylacetate vinylchloride copolymer and in some cases The container was a sachet of complex material as described in the preceding examples.

The Examples 31–40 are expressed in tabular form in Table IV.

TABLE IV

| Example No: | 31 | 32 | 33 | 34 | 35 | 36 | 37 | 38 | 39 | 40 |
|---|---|---|---|---|---|---|---|---|---|---|
| Length | 200 | 200 | 250 | 60 | 250 | 250 | 250 | 200 | 250 | 250 |
| Breadth | 100 | 80 | 80 | 50 | 60 | 80 | 60 | 80 | 80 | 80 |
| Thickness | 2 | 4 | 4 | 5 | 5 | 6 | 6 | 5 | 5 | 4 |
| SOLID MATERIAL | | | | | | | | | | |
| Constituents: | | | | | | | | | | |
| polyvinylacetate (low viscosity) | 80 | 82 | 80.5 | — | — | — | — | — | — | — |
| vinylacetate vinylchloride copolymer (10:90) | — | — | — | 71 | 60 | 50 | 54 | — | — | — |
| ethylene vinylacetate copolymer (67:33) | — | — | — | — | — | — | — | 68 | 54 | 57 |
| dibutylsebacate | — | 3.7 | — | — | 17 | — | — | 10 | — | 6 |
| triphenylphosphate | — | — | — | — | — | 19 | 5 | — | — | — |
| dioctylphthalate | — | — | 3 | 10 | — | — | — | — | 10 | — |
| blue pigment (made by CIBA-GEIGY A.G. colour index no. 74160 (pigment blue 15)) | — | 0.3 | — | 0.5 | — | — | — | 0.2 | — | — |
| red pigment (made by CIBA-GEIGY A.G. colour index no. 15865 (pigment red 48)) | — | — | 0.3 | — | 0.3 | — | — | — | 0.4 | 0.2 |
| glass fibre | 5 | — | 3 | — | — | — | — | — | — | — |
| ACTIVE LIQUID | | | | | | | | | | |
| DDVP | 10 | 12 | 10 | 18 | 22 | 30 | 30 | 20 | 25 | 28 |
| diethylsuccinate | 5 | — | — | — | — | — | — | — | — | 4 |
| dimethylmaleate | — | — | 3 | — | — | — | 10 | — | 10 | 4 |
| cyclohexyl epoxystearate | — | 2 | — | — | — | — | — | 1.5 | — | — |
| azobenzene | — | — | 0.2 | — | — | 1 | 1 | — | 0.6 | 0.8 |
| bis-2,2-(4-hydroxyphenyl) propane | — | — | — | 0.5 | 0.7 | — | — | 0.3 | — | — |
| IMPREGNATION Temperature in °C | 30 | 25 | 25 | 40 | 40 | 45 | 40 | 50 | 45 | 45 |
| STORAGE Time in days | 30 | 30 | 30 | 30 | 30 | 30 | 20 | 20 | 15 | 15 |

EXAMPLES 41 to 50

Insectical compositions were prepared according to the process according to the invention using a solid parallelipiped mass of polymeric organic material which was an ethylpolymethacrylate, a vinylacetate vinylpyrrolidone copolymer, a styrene butadiene copolymer or an acrylonitrile vinylidene chloride copolymer, and contained in some cases a pigment, a filler of glass fibre and a plasticiser which could be chosen from dibutylphthalate or dictyladipate. The insecticidal liquid B comprised DDVP as active material and in some case a volatile diluent which was dimethylsuccinate or dimethylmaleate, and one or more stabilisers chosen from epoxides, phenols or azoic compiunds. The container was a complex sachet as described in preceding examples. The examples are expressed in tabular form in Table V.

EXAMPLES 51 to 60

Compositions were prepared according to the process of the invention using a solid parallelipiped mass of polyvinylchloride as organic polymeric material together with a plasticiser which was chosen from dimethylphthalate, dibutylphthalate, dioctylphthalate, didecylphthalate, tricresylphosphate, trioctylphosphate, dioctylazelate, dioctylsebacate, dioctyladipate, and the diisobutyrate of 2,2,4-trimethylpentane-1,3-diol, and an active liquid air-conditioning agent which is "verdyl" acetate or linalyl acetate. Total contents of the solid material and of the active liquid are expressed in parts by weight, individual contents of constituents in the solid material are given in percent by weight.

The container was a complex sachet chosen from among the following, the first noted layer being turned towards the interior of the sachet obtained by welding together the edges of two sheets of equal size:

TABLE V

| Example No: | 41 | 42 | 43 | 44 | 45 | 46 | 47 | 48 | 49 | 50 |
|---|---|---|---|---|---|---|---|---|---|---|
| Length | 250 | 200 | 200 | 200 | 200 | 200 | 180 | 180 | 180 | 180 |
| Breadth | 100 | 80 | 80 | 80 | 60 | 60 | 60 | 60 | 60 | 60 |
| Thickness | 4 | 3 | 3 | 3 | 4 | 4 | 3 | 5 | 5 | 5 |
| SOLID MATERIAL | | | | | | | | | | |
| ethylpolymethacrylate (high viscosity) | 93.5 | 84 | — | — | — | — | — | — | — | — |
| vinylacetate vinylpyrrolidone copolymer (80:20) | — | — | — | 83 | — | — | 82.5 | — | — | — |
| styrene butadiene copolymer (25:75) | — | — | 83 | — | — | 81 | — | — | — | — |
| acrylonitrile vinylidenechloride copolymer (high viscosity) | — | — | — | — | 79 | — | — | 66 | 71 | 64 |
| dibutylphthalate | — | — | 2 | — | 5.5 | — | — | 7 | — | — |
| dioctyladipate | — | 2.5 | — | 3 | — | 4 | — | — | 8 | — |
| violet red pigment (made by CIBA-GEIGY A.G. colour index no. 15880 (pigment red 63)) | — | 0.2 | 0.2 | — | — | 0.2 | 0.5 | 0.3 | — | 0.2 |
| glass fibre | — | 5 | 4 | 4 | — | — | 2 | — | — | 3 |
| ACTIVE LIQUID | | | | | | | | | | |
| DDVP | 6 | 8 | 8 | 10 | 10 | 10 | 15 | 20 | 20 | 30 |
| dimethylsuccinate | — | — | — | — | 5 | 4 | — | — | — | — |
| dimethylmaleate | — | — | 2.5 | — | — | — | — | 5 | — | — |
| butylepoxystearate | 0.3 | — | — | — | — | — | — | 1.2 | — | 1.8 |
| azobenzene | 0.2 | — | 0.3 | — | 0.5 | 0.8 | — | 0.5 | 1 | — |
| 4-tertbutylphenol | — | 0.3 | — | — | — | — | — | — | — | 1 |
| Impregnation Temperature in °C | 45 | 40 | 45 | 30 | 50 | 45 | 35 | 50 | 50 | 60 |
| Storage Time in days | 15 | 20 | 20 | 20 | 20 | 25 | 20 | 25 | 30 | 30 | ionomeric resin "SURLYN A" (50 g/m²)/aluminium (9 microns)/polyester "MYLAR 50 A"

fore its closure. The examples are shown in tabular form in Tables VI, VII & VIII.

TABLE VI

| Example No: | 51 | 52 | 53 | 54 | 55 | 56 | 57 | 58 | 59 | 60 |
|---|---|---|---|---|---|---|---|---|---|---|
| Length | 150 | 100 | 120 | 80 | 100 | 100 | 75 | 100 | 150 | 150 |
| Breadth | 30 | 50 | 40 | 55 | 45 | 50 | 60 | 50 | 30 | 30 |
| Thickness | 4 | 4 | 4 | 4 | 3 | 4 | 4 | 5 | 4 | 4 |
| SOLID MATERIAL | | | | | | | | | | |
| Constituents: | | | | | | | | | | |
| polyvinylchloride (as in Examples 1–10) | 38.5 | 45.5 | 38.5 | 45.5 | 38.5 | 45.5 | 38.5 | 45.5 | 45.5 | 38.5 |
| dimethylphthalate | 61.5 | — | — | — | — | — | — | — | — | — |
| didecylphthalate | — | 54.5 | 61.5 | — | — | — | — | — | — | — |
| trioctylphosphate | — | — | — | 54.5 | 61.5 | — | — | — | — | — |
| dioctylazelate | — | — | — | — | — | 54.5 | 61.5 | — | — | — |
| dioctylsebacate | — | — | — | — | — | — | — | 54.5 | — | — |
| dioctyladipate | — | — | — | — | — | — | — | — | 54.5 | 61.5 |
| Solid Material | 63 | 64 | 62 | 64 | 66 | 63 | 63 | 57 | 64 | 64 |
| ACTIVE LIQUID | | | | | | | | | | |
| "Verdyl" acetate (a commercial name of the Swiss Company GIVAUDAN et Cie applied to 4,7-methano-3a,4,5,6,7,7a-hexahydro-inden-6-yl- acetate). | 37 | 36 | 38 | 36 | 34 | 37 | 37 | 43 | 36 | 36 |
| IMPREGNATION Temperature in °C | 40 | 40 | 40 | 40 | 40 | 40 | 40 | 40 | 40 | 40 |
| STORAGE Time in days | 7 | 7 | 7 | 7 | 7 | 7 | 7 | 7 | 7 | 7 |

TABLE VII

| Example No: | 61 | 62 | 63 | 64 | 65 | 66 | 67 | 68 | 69 | 70 |
|---|---|---|---|---|---|---|---|---|---|---|
| Length | 75 | 80 | 80 | 100 | 100 | 120 | 120 | 150 | 150 | 150 |
| Breadth | 60 | 55 | 55 | 50 | 50 | 40 | 40 | 30 | 30 | 30 |
| Thickness | 2 | 3 | 3 | 4 | 4 | 5 | 5 | 6 | 6 | 6 |
| SOLID MATERIAL | | | | | | | | | | |
| polyvinylchloride (as in Examples 1–10) | 66.7 | 55.5 | 52.6 | 50 | 50 | 45.5 | 41.6 | 38.5 | 35.7 | 35.7 |
| dibutylphthalate | — | 44.5 | — | 50 | — | 54.5 | — | 61.5 | — | — |
| dioctylphthalate | 33.3 | — | 47.4 | — | 50 | — | 58.4 | — | 64.3 | 64.3 |
| Solid Material | 79 | 78 | 80 | 77 | 78 | 77 | 80 | 78 | 79 | 80 |
| ACTIVE LIQUID | | | | | | | | | | |
| linalyl acetate | 21 | 22 | 20 | 23 | 22 | 23 | 20 | 22 | 21 | 20 |
| IMPREGNATION Temperature in °C | 20 | 40 | 20 | 20 | 20 | 20 | 40 | 20 | 20 | 40 |
| STORAGE Time in days | 22 | 6 | 22 | 22 | 6 | 22 | 6 | 22 | 22 | 6 |

TABLE VIII

| Example No: | 71 | 72 | 73 | 74 | 75 | 76 | 77 | 78 | 79 | 80 |
|---|---|---|---|---|---|---|---|---|---|---|
| Length | 75 | 80 | 80 | 100 | 60 | 60 | 50 | 120 | 100 | 150 |
| Breadth | 60 | 55 | 55 | 50 | 60 | 60 | 50 | 40 | 50 | 50 |
| Thickness | 2 | 3 | 3 | 4 | 5 | 5 | 6 | 2 | 2 | 3 |
| SOLID MATERIAL | | | | | | | | | | |
| polyvinylchloride (as in Examples 1–10) | 66.7 | 55.5 | 50 | 45.5 | 41.6 | 38.5 | 35.7 | 58.8 | 52.6 | 50 |
| tricresylphosphate | 33.3 | 44.5 | 50 | 54.5 | 58.4 | 61.5 | 64.3 | — | — | — |
| diisobutyrate of trimethylpentane diol | — | — | — | — | — | — | — | 41.2 | 47.4 | 50 |
| Solid Material | 77 | 76 | 77 | 77 | 77 | 78 | 77 | 90 | 90 | 89 |
| ACTIVE LIQUID | | | | | | | | | | |
| linalyl acetate | 23 | 24 | 23 | 23 | 23 | 22 | 23 | 10 | 10 | 11 |
| IMPREGNATION Temperature in °C | 20 | 40 | 20 | 40 | 20 | 40 | 20 | | | 40 |
| STORAGE Time in days | 22 | 6 | 22 | 6 | 22 | 6 | 22 | 120 | 22 | 22 |
| Length | 75 | 80 | 80 | 100 | 60 | 60 | 50 | 120 | 100 | 150 |
| Breadth | 60 | 55 | 55 | 50 | 60 | 60 | 50 | 40 | 50 | 50 |
| Thickness | 2 | 3 | 3 | 4 | 5 | 5 | 6 | 2 | 2 | 3 | ionomeric resin "SURLYN A" (50 g/m²)/polyethylene (60 microns)

ionomeric resin "SURLYN A" (40 g/m²)/aluminium (9 microns)/ionomeric resin "SURLY A" (25 g/m²)/paper(40 g/m²)

polyethylene (40 microns)/polyester(12 microns)/aluminium (12 microns)/paper(50 g/m²)

In all cases the ionomeric resin was polyethylene with magnesium containing inclusions; the polyester was polyethylene glycol terephthalate; the polyethylene was a high pressure polyethylene of molecular weight about 17,000 and density about 0.93 g/cm³.

The interior dimensions of the sachet (length and breadth) were greater by 20–30% than those of the solid material. Air was exhausted from the sachet be-

EXAMPLES 81 to 90

Compositions were prepared according to the process of the invention using a solid mass of polyvinylchloride as polymeric material and dibutylphthalate as plasticiser at a rate of 31 parts plasticiser per 69 parts polyvinylchloride. The polyvinylchloride used the same was as in Examples 1–10. The liquid B was formed by an active air-conditioning material in the form of a chemically defined compound (Examples given in table IX) or an odoriferannt composition (Examples given in table X).

The solid material was shaped by extrusion into a flexible tube having formed dimensions described in Experiment A. The container was a complex sachet such as described for examples 51 to 80.

TABLE IX

| Example No: | | 81 | 82 | 83 | 84 | 85 | 85 | 87 | 88 | 89 | 90 |
|---|---|---|---|---|---|---|---|---|---|---|---|
| ACTIVE LIQUID | | | | | | | | | | | |
| "verdyl" acetate (as examples 51–60) | | 33 | — | — | — | — | — | — | — | — | — |
| isomenthone (p-menthanone-3) | | — | 36 | 36 | — | — | — | — | — | — | — |
| "Hyscylene P" (k) | | — | — | — | 30 | — | — | — | — | — | — |
| citral | | — | — | — | — | 35 | — | — | — | — | — |
| "Epoxy-linalol" (l) | | — | — | — | — | — | 15 | — | — | — | — |
| "Histidal" (m) | | — | — | — | — | — | — | 15 | — | — | — |
| "Viridine" (k') | | — | — | — | — | — | — | — | 25 | — | — |
| "Florane" (n) | | — | — | — | — | — | — | — | — | 32 | — |
| linalyl acetate | | — | — | — | — | — | — | — | — | — | 24 |
| SOLID MATERIAL | | 67 | 64 | 64 | 70 | 65 | 85 | 85 | 75 | 68 | 76 |
| IMPREGNATION | Temperature in °C | 20 | 20 | 40 | 20 | 20 | 20 | 20 | 40 | 20 | 40 |
| STORAGE | Time in days | 15 | 15 | 8 | 15 | 15 | 15 | 15 | 8 | 15 | 8 |

(k) commercial dimethyl acetal of phenylacetic aldehyde produced by the French company of ROURE, BERTRAND & DUPONT.
(k') commercial name for dimethyl acetal of phenylacetic aldehyde produced by the Swiss company GIVAUDAN & CIE.
(l) commercially produced 3-hydroxy-2,2,6-trimethyl-6-vinylpyrane produced by the French company ROURE, BERTRAND & DUPONT.
(m) commercial name for the glycol acetal of 2,4-dimethyltetrahydrobenzaldehyde made by the French company ROURE, BERTRAND & DUPONT.
(n) commercial name for a liquid ester of cyclic structure having a sharp odour manufactured by the Dutch company NAARDEN.

TABLE X

| Example No: | | 91 | 92 | 93 | 94 | 95 | 96 | 97 | 98 | 99 | 100 |
|---|---|---|---|---|---|---|---|---|---|---|---|
| ACTIVE LIQUID | | | | | | | | | | | |
| lavender 1239 (Daniel BLAYN & CIE) | | 33 | 35 | — | — | — | — | — | — | — | — |
| pine 1002 (Daniel BLAYN & Cie) | | — | — | 30 | 33 | 35 | — | — | — | — | — |
| forest odour 8441 M (HAARMANN REIMER) | | — | — | — | — | — | 30 | 33 | 35 | — | — |
| pine green 28.474 A (HAARMANN REIMER) | | — | — | — | — | — | — | — | — | 38 | 38 |
| SOLID MATERIAL % | | 67 | 65 | 70 | 67 | 65 | 70 | 67 | 65 | 62 | 62 |
| IMPREGNATION | Temperature in °C | 40 | 20 | 30 | 40 | 20 | 30 | 40 | 20 | 40 | 20 |
| STORAGE | Time in days | 8 | 15 | 10 | 8 | 15 | 10 | 8 | 15 | 8 | 15 |

EXAMPLES 101 to 110

Compositions were prepared according to the process of the invention using liquid B formed by terpenyl acetate or "verdyl" acetate and a solid mass in parralipiped form of a polymeric substance of cellular or spongy structure, for example, polyurethane foam, latex foam, polyvinylchloride foam, or an alveolar-regenerated cellullose starting from viscose. The container was a complex sachet such as described for Examples 51 to 80. The Examples are shown in tabular form in Table XI.

cess of the present invention using a liquid B formed of an insectifugal substance chosen from citronellal, hexyl mandelate, citronella oil, β-tetranol and diethylaetamide, and a solid material parallelipiped of an organic polymeric substance which was polyvinyl chloride or a vinyl chloride vinyl acetate copolymer, together with a plasticiser chosen from dibutylphthalate, diisooctyladipate and tricresylphosphate. Values are expressed in parts by weight and dimensions given in mm. The container was a complex sachet such as described for Examples 51–80. The Examples are shown in tabular form in Table XII.

TABLE XI

| SOLID MATERIAL | Example No: | 101 | 102 | 103 | 104 | 105 | 106 | 107 | 108 | 109 | 110 |
|---|---|---|---|---|---|---|---|---|---|---|---|
| Length | | 130 | 160 | 100 | 60 | 80 | 120 | 150 | 120 | 100 | 100 |
| Breadth | | 30 | 50 | 50 | 60 | 50 | 40 | 60 | 50 | 50 | 60 |
| Thickness | | 5 | 6 | 5 | 4 | 5 | 4 | 3 | 5 | 8 | 6 |
| Constituents: | | | | | | | | | | | |
| rigid polyurethane ether foam (d = 0.020) | | 40 | — | — | 45 | — | — | — | — | — | — |
| flexible polyurethane ether foam (d = 0.025) | | — | 35 | — | — | 40 | — | — | — | — | — |
| latex foam (d = 0.16) | | — | — | 25 | — | — | 30 | — | — | — | — |
| polyvinyl chloride foam (d = 0.56) | | — | — | — | — | — | — | 60 | 50 | 40 | — |
| alveolar regenerated cellulose (d = 0.05) | | — | — | — | — | — | — | — | — | — | 40 |
| ACTIVE LIQUID | | | | | | | | | | | |
| terpenyl acetate | | — | — | — | 55 | 60 | 70 | — | — | 60 | — |
| "verdy" acetate | | 60 | 65 | 75 | — | — | — | 40 | 50 | — | 60 |
| IMPREGNATION | Temperature in °C | 20 | 20 | 20 | 40 | 40 | 40 | 40 | 40 | 40 | 40 |
| STORAGE | Time in days | 25 | 25 | 25 | 7 | 7 | 7 | 11 | 11 | 7 | 7 |

EXAMPLES 111 to 120

Compositions were prepared according to the process

TABLE XII

| SOLID MATERIAL | Example No: | 111 | 112 | 113 | 114 | 115 | 116 | 117 | 118 | 119 | 120 |
|---|---|---|---|---|---|---|---|---|---|---|---|
| Length | | 250 | 220 | 200 | 300 | 300 | 200 | 250 | 200 | 180 | 125 |
| Breadth | | 80 | 80 | 70 | 70 | 80 | 80 | 70 | 70 | 80 | 125 |
| Thickness | | 3 | 5 | 4 | 5 | 5 | 4 | 5 | 4 | 4 | 5 |
| Constituents: | | | | | | | | | | | |
| polyvinyl chloride (as in examples 1–10) | | 67 | 55 | 63 | 58 | 62 | 60 | 58 | — | — | — |

TABLE XII—Continued

| SOLID MATERIAL | Example No: | 111 | 112 | 113 | 114 | 115 | 116 | 117 | 118 | 119 | 120 |
|---|---|---|---|---|---|---|---|---|---|---|---|
| vinyl acetate vinyl chloride copolymer (10:90) | | — | — | — | — | — | — | — | 80 | 86 | 79 |
| dibutylphthalate | | 25 | — | — | — | 20 | 20 | — | 5 | 4 | — |
| diisooctyladipate | | — | 20 | — | 30 | — | — | 24 | — | — | 6 |
| tricresylphosphate | | — | — | 17 | — | — | — | — | — | — | — |
| ACTIVE LIQUID | | | | | | | | | | | |
| citronellal | | 8 | — | — | — | — | 6 | 6 | — | 10 | — |
| hexyl mandelate | | — | 25 | — | — | — | 14 | — | 15 | — | — |
| citronella oil | | — | — | — | 12 | — | — | — | — | — | — |
| β-tetralol | | — | — | — | — | 18 | — | — | — | — | — |
| diethylacetamide | | — | — | 20 | — | — | — | 12 | — | — | 15 |
| IMPREGNATION | Temperature in °C | 30 | 50 | 40 | 30 | 50 | 30 | 30 | 50 | 40 | 50 |
| STORAGE | Time in days | 30 | 20 | 25 | 40 | 25 | 45 | 40 | 40 | 40 | 30 |

What is claimed is:

1. A process for the manufacture of a liquid free evaporator device enclosed in an impermeable container and allowing, at room temperature and after withdrawal of said container, a permanent evaporation over a long period of time of a volatile organic liquid (B) consisting of O,O-dimethyl-O-2,2-dichlorovinyl phosphate or of an odorant substance selected from the group consisting of a natural essential oil, an individual natural odorant component of a natural essential oil, a synthetic odorant or mixtures thereof, having a vapor pressure at 20°C of 0.01 to 5 Torr, or of a mixture of these materials with liquid diluents having at 20°C, a vapor pressure of from 0.001 to 30 Torr, said evaporator consisting of a shaped, solid synthetic plasticized or nonplasticized compact thermoplastic resin (A) having a hydrophobic surface and a molecular weight above 1000 and wherein 0.05 to 4 parts by weight of (B) per part by weight of (A) is homogeneously distributed in the form of a solid solution, said process consisting essentially in:
   a. placing (A) in contact with the liquid (B) in said impermeable container, which container is impervious to said liquid (B),
   b. sealing said container and
   c. storing the assembly thus-formed at a temperature between 0 and 80°C for a minimum time period inversely proportional to the storage temperature and for at least one day, the part of the surface of (A) placed in contact with (B) being such as to allow the complete penetration and uniform distribution in (A) of the whole liquid (B) within said minimum storage period.

2. A process as described in claim 1, wherein mass A is shaped in the form of a block, plate, sheet, strip or shaped rod.

3. A process as described in claim 1, wherein mass A is shaped so as to contain a cavity and the liquid B is introduced into said cavity.

4. A process as described in claim 3, wherein said mass A is shaped in the form of a tube of which the interior and exterior cross sectional contours are elliptic or lenticular.

5. A process as described in claim 1, wherein the ratio of the surface portion of mass A, contacted by liquid B at the beginning of impregnation, to the volume of mass A, measured in square centimeters and cubic centimeters, respectively, is at least equal to 2.

6. A process as described in claim 1, wherein the of liquid B introduced is in a weight ratio of from 0.1 to 0.8 part per part of mass A.

7. A process as described in claim 1, wherein the tube is sealed by welding after introduction of liquid B.

8. A process as described in claim 1, wherein the resin (A) is a non-plasticized polyvinyl resin or a polyvinyl resin having a plasticizer content of at most 75% calculated on the weight of the plasticized resin.

9. A process as described in claim 8, wherein the polyvinyl resin is a polymerisate or copolymerisate of vinyl chloride.

10. A process as described in claim 8, wherein the polyvinyl resin has a plasticizer content of from 10 to 65% calculated on the weight of the plasticized resin.

11. A process as described in claim 1, wherein the liquid B contains a plasticizer for said macromolecular substance in a weight ratio of from 0, 1 to 10 parts per part of volatile active material.

12. A process as described in claim 1, wherein the liquid B contains in solution a stabilizer for the volatile organic liquid.

13. A process as described in claim 1, wherein said container is a flexible sachet, the shape of which is approximately that of the body A, and the internal volume of which is equal to or slightly greater than the volumes of A and of the liquid B taken together.

14. A process as described in claim 1, wherein air contained in the container is evacuated before or after introduction of the liquid B, and before sealing.

15. A process as described in claim 1, wherein the the storage temperature is from 20 to about 40°C.

16. A process as described claim 1, wherein
   a. the impermeable container is in the form of a sachet produced from a sheet comprising a 36 micron thick layer of polyethylene and a 30 micron layer of aluminium the latter layer being turned towards the outside,
   b. the resin A is formed of solid flexible polyvinylchloride plasticized by a content of dibutylphthalate of about 40% by weight of the plasticized resin, and having the form of a tube closed at one end, and
   c. the liquid B is O,O-dimethyl-O-2,2-dichlorovinyl phosphate,
   and in which the liquid B is introduced into the tube in a weight proportion of 1 part of liquid B per 2 parts of solid body A, the open end of the tube is then closed by welding and the system thus obtained is placed into said container, the container is then exhausted of air and then closed by welding, the resulting assembly being then stored at a temperature of about 40°C for about 120 hours.

17. A process as described in claim 1, wherein the solid resin (A) is a non-plastified or plastified resin selected from the group consisting of a polyvinylchloride, a polyvinylacetate, a polyethyacrylate, an ethylene vinylacetate copolymer, an acrylonitrile vinylidenechloride copolymer, a vinylacetate vinylpyrrolidone copolymer, a styrene butadiene copolymer or a vinylacetate vinylchloride copolymer.

18. A process as described in claim 1, wherein said liquid B contains at least one volatile insectifugal substance selected from the group consisting of citronellal, hexalmandelate, citronella oil, β-tetranol and diethylacetamide.

19. A process as described in claim 1, wherein said liquid B contains at least one volatile odorant selected from the group consisting of lavendar oil, pine oil, linalyl acetate, terpenyl acetate, dihydronor-dicyclopentadienyle acetate, citral, phenylacetic aldehyde dimethylacetal, 2,4-dimethyltetrahydrobenzaldehyde glycol acetal, 3-hydroxy-2,2,6-trimethyl-6-vinylpyrane and para-menthanone-3.

20. A process as described in claim 1, wherein said resin A contains at least one organic plasticizer selected from the group consisting of dibutyl-, dioctyl-, didecylphthalate, dimethyl-, diethyl-succinate, dimethylmaleate, dioctyl-, diisooctyladipate, tricresyl-, triphenyl-, trioctylphosphate, dioctylazelate, dioctylsebacate, and diisobutyrate of 2,2,4-Trimethylpentane-1,3-diol.

21. A process as described in claim 20, wherein the liquid B contains 10 to 75% by weight of a diluent having a vapour pressure at 20°C. of 0.001 to 30 Torr, and selected from the group consisting of methyllaurate, methyl caprate, dimethyl-, diethylsuccinate, and dimethyl-, diethylmaleate.

* * * * *